No. 662,774. Patented Nov. 27, 1900.
F. P. DAVIS.
TOW LINE OPERATOR AND ALARM.
(Application filed July 26, 1900.)

(No Model.)

Witnesses.

Inventor.
Franklin P. Davis

UNITED STATES PATENT OFFICE.

FRANKLIN P. DAVIS, OF MOBILE, ALABAMA.

TOW-LINE OPERATOR AND ALARM.

SPECIFICATION forming part of Letters Patent No. 662,774, dated November 27, 1900.

Application filed July 26, 1900. Serial No. 24,926. (No model.)

*To all whom it may concern:*

Be it known that I, FRANKLIN P. DAVIS, a citizen of the United States, residing at Mobile, in the county of Mobile and State of Alabama, have invented certain new and useful Improvements in Automatic Tow-Line Operators and Alarms, of which the following is a specification.

This invention relates to a reel attachment for boats, and particularly to a spring-controlled reel for automatically working the line of a trailing boat or skiff, according to the movement of the latter, and of a yacht or other vessel carrying the reel.

One object of the invention is to provide a spring-controlled reel adapted to be attached to a yacht or other vessel and having a trailing-line end secured to the drum of the reel, with a stop-knot in the line, the other end of the line being attached to a row-boat or skiff, whereby the latter is free to trail after the vessel, with the line always in taut condition.

A further object of the invention is to provide an alarm device for the reel, whereby the latter will operate and sound the alarm gradually or at intervals during the proper working of the line; but in case of accident to the line the reel will make a continuous or rushing sounding of the alarm, thereby giving a signal of distress.

Other objects, advantages, and improved results are to be attained by and through the invention, as hereinafter disclosed.

Figure 1:
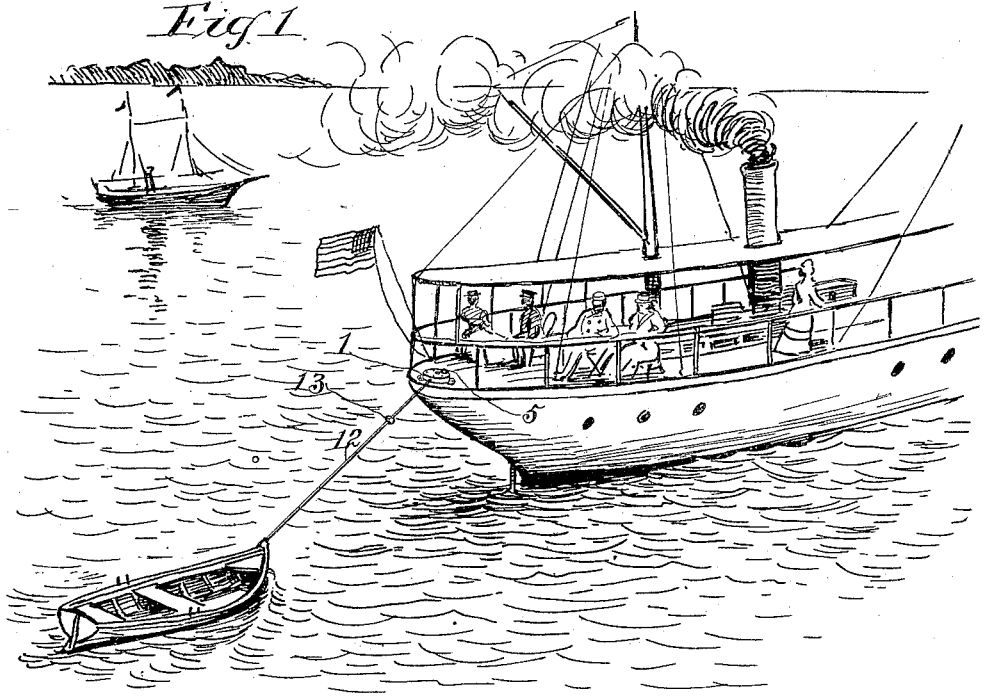
Figure 2:
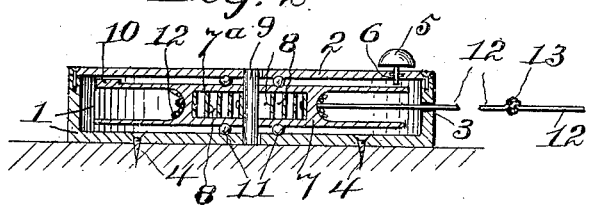
Figure 3:
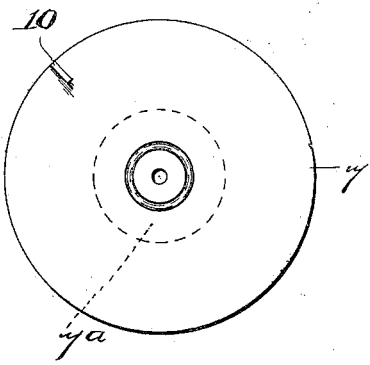

In the accompanying drawings, forming part of this application, Figure 1 is a perspective view of a yacht carrying the reel and having a skiff or row-boat trailed thereby. Fig. 2 is a sectional view of the reel and its casing. Fig. 3 is a top view of the reel.

The same numeral references denote the same parts throughout the several views of the drawings.

A reel-casing 1, having a removable top 2 and a side eye or aperture 3, is secured to the vessel or yacht deck by screws 4, or the casing may have exterior ears for securing it in any suitable or convenient position about, in, or upon a yacht or other vessel. The top 2 is provided with a bell 5, having a pendant 6, from the bell-clapper through the said top.

The reel 7 has a hollow drum 7ª, containing a coil-spring 8, one end of which is attached to the drum and the other end to spindle 9, which is secured to the top and bottom of the reel-casing. The reel is provided with a lug 10 to engage the bell-pendant 6 during the revolution of the reel in both directions, and thereby sound the bell. The reel is mounted in the casing upon the spindle 9 and has ball-bearings 11 between it and the top and bottom of the casing. A line of rope 12 has one end secured to the drum, passes through the aperture 3, is provided with a stop-knot 13, and its other end is secured to a row-boat or skiff.

The operation is as follows: The reel is turned to wind up or compress the spring. One end of the trailing line is secured to the drum. The other end is passed through the casing-aperture and provided with a knot at the distance from this end of the rope it is intended that the boat or skiff shall trail from the yacht or vessel. Then the reel is permitted to turn or revolve in the opposite direction, which winds the line upon the drum until it is stopped by the knot striking the casing at the said aperture. In this condition the free end of the line is ready for the boat or skiff, and the latter in trailing from the line will maintain a sufficient distance from the vessel, as may be desired. Owing to the spring tension of the line and because of this tension and the pull of the skiff the line is kept taut, and it may be drawn from the drum by the action of the vessel or boat or by both jointly, but is automatically rewound thereon. During the turning of the reel in either direction, which is gradually back and forth, according to the relative movement of the skiff and vessel, the lug 10 strikes the bell-pendant and sounds the bell, which is an indication that all is working well; but should the skiff become detached, the line break at any point, or other accident happen to the proper working of the device the expansion of the spring will retract the reel with a rush and sound the bell continuously, thus giving a signal of distress.

In some cases it may not be convenient to have the stop-knot work against the casing. In such cases I fix a screw-eye, bull's-eye, or chock to the vessel and pass the line through it, so that the stop-knot will strike the eye.

Having thus described my invention, what

I claim as new, and desire to secure by Letters Patent, is—

1. An automatic tow-line operator adapted to be attached to a yacht or other vessel, comprising a reel having one end of the line secured thereto in operative connection with an audible signal on the reel, and the other end attached to a skiff or boat to be towed, a stop-knot at a predetermined point in the line, a spring in the reel to automatically turn the latter relative to the movement of the skiff and yacht, and means engaged by the knot to stop the turning of the reel and to leave the end of the line nearest the knot free to operate the skiff.

2. The combination, with the casing having a removable top an eye in the casing and means for attaching the casing in a flat position to a yacht or other vessel, of the spring-controlled reel, a line extending through the eye and having one end secured to the reel and operated by the movement of the yacht or vessel to actuate an audible signal on the reel, a knot at a predetermined point in the line to limit the recoil of the latter through the eye, and to leave the portion of the line from the knot outside the casing free.

In witness whereof I hereunto set my hand in the presence of two witnesses.

FRANKLIN P. DAVIS.

Witnesses:
JAS. W. GRAY,
D. P. BESTOR.